US008432977B2

(12) United States Patent  
Fukuda

(10) Patent No.: US 8,432,977 B2
(45) Date of Patent: Apr. 30, 2013

(54) INFORMATION PROCESSING APPARATUS AND SIGNAL TRANSMISSION METHOD

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1016 days.

(21) Appl. No.: 12/428,024

(22) Filed: Apr. 22, 2009

(65) Prior Publication Data

US 2009/0268824 A1 Oct. 29, 2009

(30) Foreign Application Priority Data

Apr. 23, 2008 (JP) ................................ P2008-112793

(51) Int. Cl.
*H04B 14/06* (2006.01)
*H04L 27/04* (2006.01)

(52) U.S. Cl.
USPC .......................................... 375/244; 375/309

(58) Field of Classification Search .................. 375/244, 375/254, 257, 286, 287, 293–296, 316, 309
See application file for complete search history.

(56) References Cited

U.S. PATENT DOCUMENTS

| | | | |
|---|---|---|---|
| 3,369,181 A | | 2/1968 | Braymer |
| 4,584,690 A | * | 4/1986 | Cafiero et al. ................ 375/290 |
| 4,665,531 A | * | 5/1987 | Aly ............................... 375/286 |
| 4,860,009 A | * | 8/1989 | LaRowe ........................ 341/73 |
| 5,040,190 A | * | 8/1991 | Smith et al. .................. 375/214 |
| 5,550,864 A | * | 8/1996 | Toy et al. ..................... 375/293 |
| 6,473,252 B1 | * | 10/2002 | Graham ........................ 360/40 |
| 7,912,143 B1 | * | 3/2011 | Graham ........................ 375/288 |
| 2003/0194017 A1 | | 10/2003 | Woodworth |
| 2009/0323828 A1 | * | 12/2009 | Sugita et al. .................. 375/257 |
| 2010/0027708 A1 | * | 2/2010 | Fukuda et al. ................ 375/286 |
| 2010/0027728 A1 | * | 2/2010 | Sugita et al. .................. 375/354 |
| 2010/0054359 A1 | * | 3/2010 | Sugita et al. .................. 375/288 |
| 2010/0085988 A1 | * | 4/2010 | Fukuda ......................... 370/480 |
| 2010/0329381 A1 | * | 12/2010 | Shimizu et al. ............... 375/293 |
| 2011/0038428 A1 | * | 2/2011 | Fukuda ......................... 375/259 |

FOREIGN PATENT DOCUMENTS

| | | |
|---|---|---|
| GB | 2 242 105 A | 9/1991 |
| JP | 03-109843 | 5/1991 |
| JP | 03-109843 * | 9/1991 |

OTHER PUBLICATIONS

European Search Report in European Application No. EP 09 15 6570; Jul. 26, 2010.

* cited by examiner

*Primary Examiner* — Lawrence B Williams
(74) *Attorney, Agent, or Firm* — Finnegan Henderson Farabow Garrett & Dunner LLP

(57) ABSTRACT

There is provided an information processing apparatus including an encoding unit that represents input data containing mutually different first and second bit values by a plurality of first amplitude values for the first bit value and a second amplitude value that is different from the first amplitude values for the second bit value, does not take an identical value consecutively, and perform encoding so that polarity of the amplitude value is reversed for each cycle, and a transmission unit that transmits a signal encoded by the encoding unit through a predetermined transmission line.

8 Claims, 13 Drawing Sheets

PRIOR ART

PRIOR ART

PRIOR ART

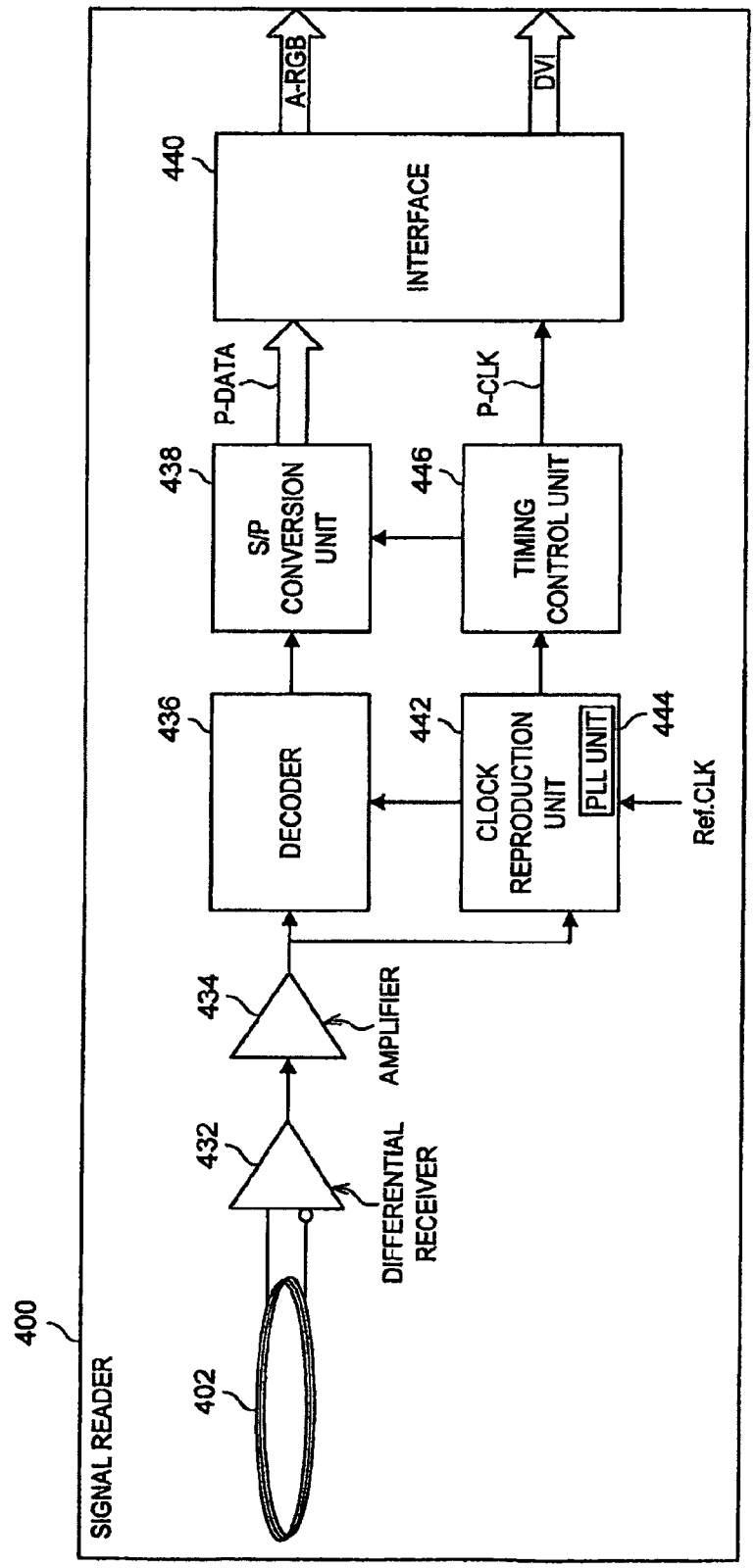

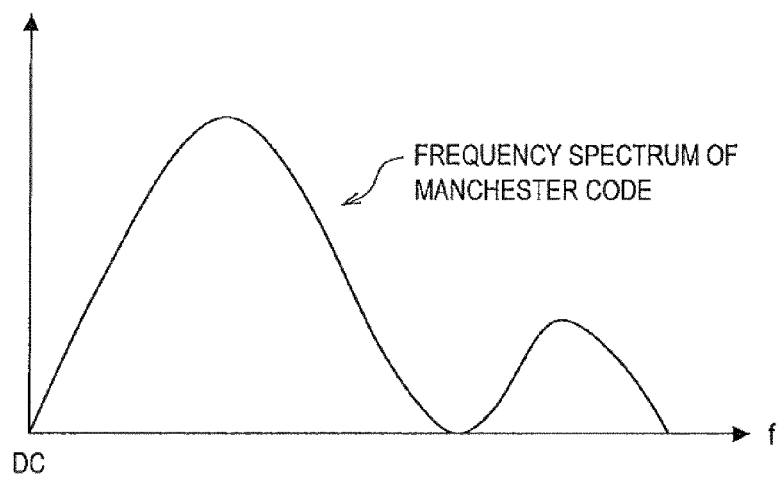
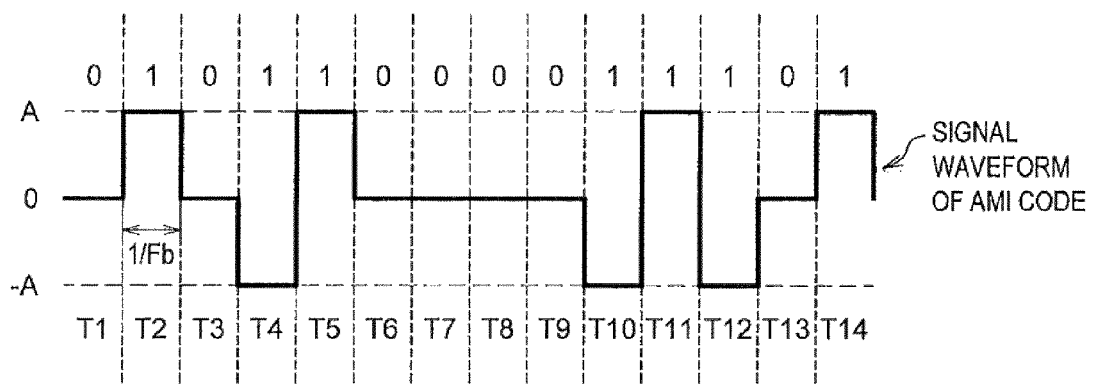
FIG.8

INFORMATION PROCESSING APPARATUS AND SIGNAL TRANSMISSION METHOD

RELATED APPLICATION

The present application contains subject matter related to that disclosed in Japanese Priority Patent Application JP 2008-112793 filed in the Japan Patent Office on Apr. 23, 2008, the entire content of which is hereby incorporated by reference.

BACKGROUND OF THE INVENTION

1. Field of the Invention

The present invention relates to an information processing apparatus and a signal transmission method.

2. Description of the Related Art

Mobile terminals exemplified by mobile phones frequently include a movable member as a connecting portion between an operation portion operated by a user and a display portion in which information is displayed. For example, an opening/closing structure of a folding mobile phone is typical of such a movable member. Further, recent mobile phones have, in addition to the calling and mail functions, a viewing function of images or an imaging function and thus, it is necessary for the connecting portion to be movable in a complex manner in accordance with usage of the user. When the viewing function of images is used, for example, the user desires to direct the display portion toward the user and the operation portion unnecessary for viewing put away. Thus, a structure allowing the orientation or position of the display portion to change in accordance with usage thereof when a mobile phone is used as an ordinary phone, used as a digital camera, used as a TV set and the like is demanded.

As a matter of fact, a large number of signal lines and power lines are wired through the connecting portion between the operation portion and display portion. For example, several tens of wires are connected in parallel in the display portion (see FIG. 1). Thus, if a movable member capable of making complex motions described above is used as a connecting portion, reliability and the like of such wires will significantly decrease. For such reasons, technology used is being shifted from the parallel transmission method to the serial transmission method (see FIG. 2) to reduce the number of signal lines in the connecting portion. Naturally, a technological shift for similar reasons is not limited to the world of mobile phones and occurs in the world of various electronic devices in which complex wiring is demanded. In addition to the above reason, serialization also seeks to reduce electromagnetic noise (EMI: Electro Magnetic Interference).

In the serial transmission method, transmission data is transmitted after being encoded according to a predetermined method. For example, the NRZ (Non Return to Zero) coding mode, Manchester coding mode, or AMI (Alternate Mark Inversion) coding mode is used as the coding mode. Japanese Patent Application Laid-Open No. 3-109843, for example, discloses a technology to transmit data by using the AMI code, which is a typical example of bipolar code. Further, the Patent Document also discloses a technology to represent and transmit a data clock by a median value of a signal level and reproduce the data clock based on the signal level on the receiving side.

SUMMARY OF THE INVENTION

A signal in the NRZ coding mode among the above coding modes contains a DC component. Thus, it is difficult to transmit a signal in the NRZ coding mode together with a DC component of a power supply or the like. On the other hand, a signal in the Manchester coding mode or AMI (Alternate Mark Inversion) coding mode does not contain a DC component. Thus, such a signal can be transmitted together with a DC component of a power supply or the like. However, it is necessary for the Manchester coding mode or AMI coding mode to set up a PLL (Phase-Locked Loop) circuit to reproduce a data clock of a signal on the receiving side. Thus, with a PLL circuit provided on the receiving side, current consumption will increase. Moreover, data is transmitted by using rise and fall shapes of amplitude in the Manchester coding mode and thus, it is necessary to transmit data at a clock two times faster than a data rate. As a result, a higher clock operation will cause an increase in current consumption.

The present invention has been made in view of the above issues, and it is desirable to provide a novel and improved information processing apparatus capable of reducing current consumption by generating and transmitting code that does not contain any DC component and does not need a PLL circuit for clock reproduction and a signal transmission method.

In order to solve the above issue, according to an embodiment of the present invention, there is provided an information processing apparatus including an encoding unit that represents input data containing mutually different first and second bit values by a plurality of first amplitude values for the first bit value and a second amplitude value that is different from the first amplitude values for the second bit value, does not take an identical value consecutively, and perform encoding so that polarity of the amplitude value is reversed for each cycle and a transmission unit that transmits a signal encoded by the encoding unit through a predetermined transmission line.

Thus, the encoding unit of the information processing apparatus represents input data containing mutually different first and second bit values by a plurality of first amplitude values for the first bit value and a second amplitude value that is different from the first amplitude values for the second bit value, does not take an identical value consecutively, and perform encoding so that polarity of the amplitude value is reversed for each cycle. Then, the transmission unit of the information processing apparatus transmits a signal encoded by the encoding unit through a predetermined transmission line. With the above configuration, a clock component of an encoded signal can be detected by detecting a cycle of polarity reversal of the signal. As a result, there is no need to provide a PLL (Phase Locked Loop) circuit on a receiving side and therefore, power consumption of the information processing apparatus is reduced.

The encoding unit may be configured to include a data encoding unit that encodes the input data into an encoded signal X of a transmission speed Fb in which the first bit value is represented as an amplitude value 0 and the second bit value is represented as a repetition of amplitude values A and −A (A is any real number) and a clock addition unit that adds a clock signal having an amplitude value n*A (n>1) and a frequency Fb/2 to the encoded signal X encoded by the data encoding unit.

The code X may be a bipolar code. Further, the code X may be an AMI (Alternate Mark Inversion) code with 100% duty. Alternatively, the code X may be a code of a partial response method.

The information processing apparatus may further include a bit value identification unit that determines whether the amplitude value of an encoded signal transmitted through the predetermined transmission line is the first amplitude value or the second amplitude value and identifies the first bit value or the second bit value based on a result of the determination, and a clock detection unit that detects the reversal cycle of polarity held by the amplitude value of the encoded signal to detect a clock of the encoded signal based on the reversal cycle.

The information processing apparatus may further include a signal superimposing unit that superimposes the encoded signal output by the encoding unit on a power supply to generate a superimposed signal and passes the superimposed signal to a power supply line, and a signal separating unit that separates the superimposed signal acquired from the power supply line into the encoded signal and the power supply and inputs the encoded signal into the bit value identification unit and the clock detection unit. In this case, the power supply line is used as the predetermined transmission line.

In order to solve the above issue, according to another embodiment of the present invention, there is provided a signal transmission method including the steps of: generating an encoded signal by representing input data containing mutually different first and second bit values by a plurality of first amplitude values for the first bit value and a second amplitude value that is different from the first amplitude values for the second bit value, not taking an identical value consecutively, and performing encoding so that polarity of the amplitude value is reversed for each cycle; determining whether the amplitude value of the encoded signal transmitted through the predetermined transmission line is the first amplitude value or the second amplitude value; identifying the first bit value or the second bit value based on an determination result at the determination step; detecting the reversal cycle of polarity held by the amplitude value of the encoded signal; and detecting a clock of the encoded signal based on the reversal cycle detected at the polarity detection step.

Thus, the encoding step in the signal transmission method generates an encoded signal by representing input data containing mutually different first and second bit values by a plurality of first amplitude values for the first bit value and a second amplitude value that is different from the first amplitude values for the second bit value, not taking an identical value consecutively, and performing encoding so that polarity of the amplitude value is reversed for each cycle. Further, the bit value determination step determines whether the amplitude value of the encoded signal transmitted through the predetermined transmission line is the first amplitude value or the second amplitude value. Then, the polarity detection step detects the reversal cycle of polarity held by the amplitude value of the encoded signal. The clock detection step detects a clock of the encoded signal based on the reversal cycle detected at the polarity detection step.

In order to solve the above issue, according to another embodiment of the present invention, there may be provided a program to cause a computer to realize functions held by the above information processing apparatus. Further, a recording medium in which the program is recorded may be provided.

According to the embodiments of the present invention described above, current consumption can be reduced by generating and transmitting code that does not contain any DC component and does not need a PLL circuit for clock reproduction. Moreover, it becomes possible to transmit data together with DC components of a power supply and the like.

BRIEF DESCRIPTION OF THE DRAWINGS

FIG. 6 is an explanatory view showing a function configuration example of the signal reader according to serial transmission;

FIG. 7B is an explanatory view showing an example of a frequency spectrum in Manchester code;

FIG. 8 is an explanatory view showing an example of a signal waveform of AMI code;

DETAILED DESCRIPTION OF THE PREFERRED EMBODIMENTS

Figure 1:
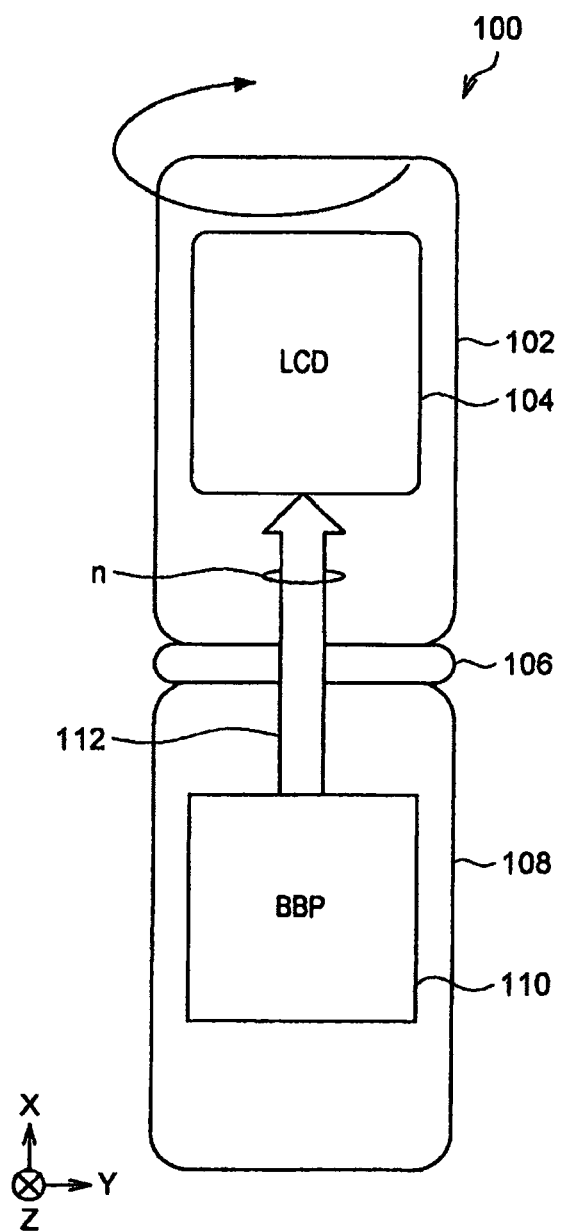
FIG. 1 is an explanatory view showing a configuration example of a mobile terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Summary of an Issue]

Before describing technology according to an embodiment of the present invention in detail, an issue to be solved by the embodiment will be briefly summarized.

(Parallel Transmission Method)

A configuration example of a mobile terminal 100 in which a parallel transmission method is adopted will be briefly described with reference to FIG. 1. FIG. 1 is an explanatory view showing a configuration example of the mobile terminal 100 in which the parallel transmission method is adopted. In FIG. 1, a mobile phone is schematically illustrated as an example of the mobile terminal 100. However, the technology according to a description that follows is not limited to the mobile phone.

As shown in FIG. 1, the mobile terminal 100 mainly includes a display unit 102, a liquid crystal unit 104 (LCD), a connection unit 106, an operation unit 108, a baseband processor 110 (BBP), and a parallel signal line 112. Incidentally, the display unit 102 may be called a display side and the operation unit 108 a main body side. In the description that follows, an example in which an image signal is transmitted from the main body side to the display side is taken. Naturally, the technology described below is not limited to the case of example.

As shown in FIG. 1, the liquid crystal unit 104 is provided in the display unit 102. Then, an image signal transmitted via the parallel signal line 112 is displayed in the liquid crystal unit 104. The connection unit 106 is a member to connect the display unit 102 and the operation unit 108. The connecting member forming the connection unit 106 has, for example, a structure to allow the display unit 102 to rotate in a Z-Y plane by 180 degrees. The connecting member also has a structure so that the display unit 102 is formed to be rotatable in an X-Y plane and the mobile terminal 100 can be folded. Incidentally, the connecting member may have a structure to allow the display unit 102 to move in a free direction.

The baseband processor 110 is an arithmetic processing unit that provides an execution function of communication control and applications of the mobile terminal 100. A parallel signal output from the baseband processor 110 is transmitted to the liquid crystal unit 104 of the display unit 102 through the parallel signal line 112. The parallel signal line 112 has a large number of signal lines wired therein. In the case of a mobile phone, for example, the number n of signal lines is about 50. The transmission speed of an image signal is about 200 Mbps when the resolution of the liquid crystal unit 104 is QVGA. The parallel signal line 112 is wired to pass through the connection unit 106.

That is, the connection unit 106 has a large number of signal lines forming the parallel signal line 112 therein. If the movable range of the connection unit 106 is extended as described above, the possibility of the parallel signal line 112 being damaged by movement thereof increases. As a result, reliability of the parallel signal line 112 will decrease. If, on the other hand, an attempt is made to maintain reliability of the parallel signal line 112, the movable range of the connection unit 106 will be significantly limited. For these reasons, the serial transmission method is frequently adopted for the mobile terminal 100 for the purpose of making flexibility of the movable member forming the connection unit 106 consistent with reliability of the parallel signal line 112. Also in terms of electromagnetic noise (EMI), serialization of transmission line has been promoted.

(Serial Transmission Method)

Figure 2:
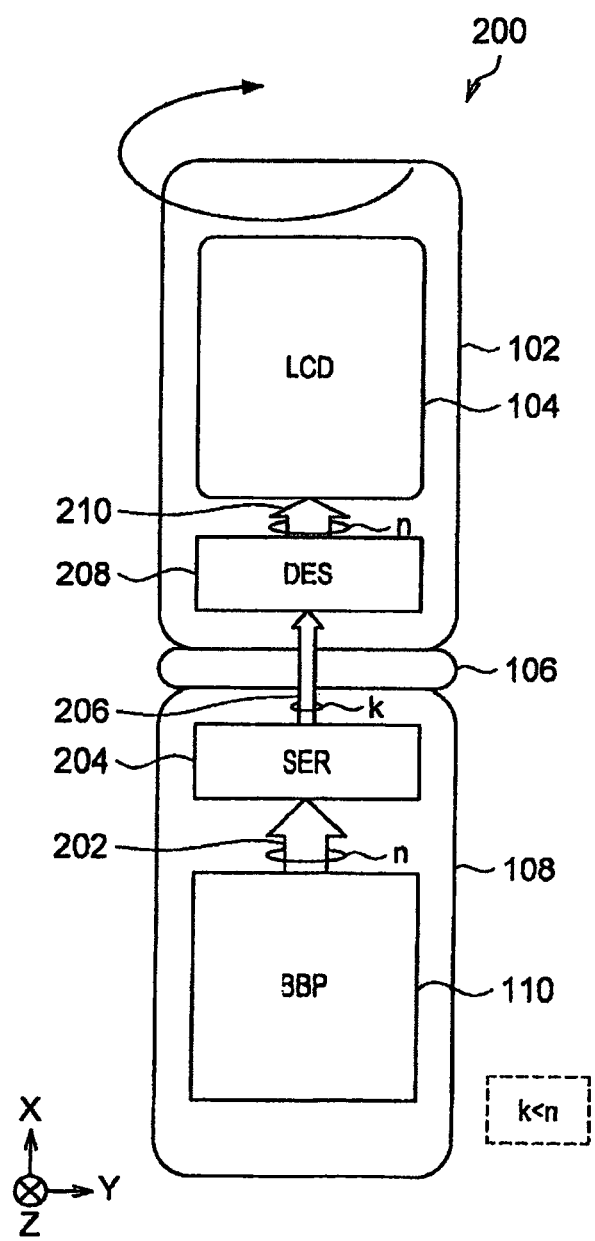
FIG. 2 is an explanatory view showing a configuration example of the mobile terminal.

Thus, a configuration example of a mobile terminal 200 in which the serial transmission method is adopted will be briefly described with reference to FIG. 2. FIG. 2 is an explanatory view showing a configuration example of the mobile terminal 200 in which the serial transmission method is adopted. In FIG. 2, a mobile phone is schematically illustrated as an example of the mobile terminal 200. However, the technology according to a description that follows is not limited to the mobile phone. The same reference numerals are attached to components having substantially the same function as those of the mobile terminal 100 in the parallel transmission method shown in FIG. 1 to omit a detailed description thereof.

As shown in FIG. 2, the mobile terminal 200 mainly includes the display unit 102, the liquid crystal unit 104 (LCD), the connection unit 106, the operation unit 108, the baseband processor 110 (BBP), parallel signal lines 202 and 210, a serializer 204, a serial signal line 206, and a deserializer 208.

In contrast to the mobile terminal 100, the mobile terminal 200 transmits an image signal by the serial transmission method through the serial signal line 206 wired in the connection unit 106. Thus, the operation unit 108 is provided with the serializer 204 for serializing parallel signals output from the baseband processor 110. On the other hand, the display unit 102 is provided with the deserializer 208 to parallelize a serial signal transmitted through the serial signal line 206.

The serializer 204 converts parallel signals output from the baseband processor 110 and input via the parallel signal line 202 into a serial signal. The serial signal converted by the serializer 204 is input into the deserializer 208 through the serial signal line 206. Then, the deserializer 208 restores the original parallel signals from the input serial signal, which are input into the liquid crystal unit 104 through the parallel signal line 210.

A data signal encoded, for example, by NRZ coding mode is alone transmitted or a data signal and a clock signal are together transmitted through the serial signal line 206. The number k of wires in the serial signal line 206 is significantly smaller than the number n of wires in the parallel signal line 112 in the mobile terminal 1 in FIG. 1 (k<<n). For example, the number k of wires can be reduced to several wires. Thus, flexibility of the movable range of the connection unit 106 in which the serial signal line 206 is wired can be considered to be extremely larger than the connection unit 106 in which the parallel signal line 112 is wired. At the same time, reliability of the serial signal line 206 can be considered to be higher. Incidentally, a differential signal such as LVDS (Low Voltage Differential Signal) is used as a serial signal passing through the serial signal line 206.

(Function Configuration)

Figure 3:
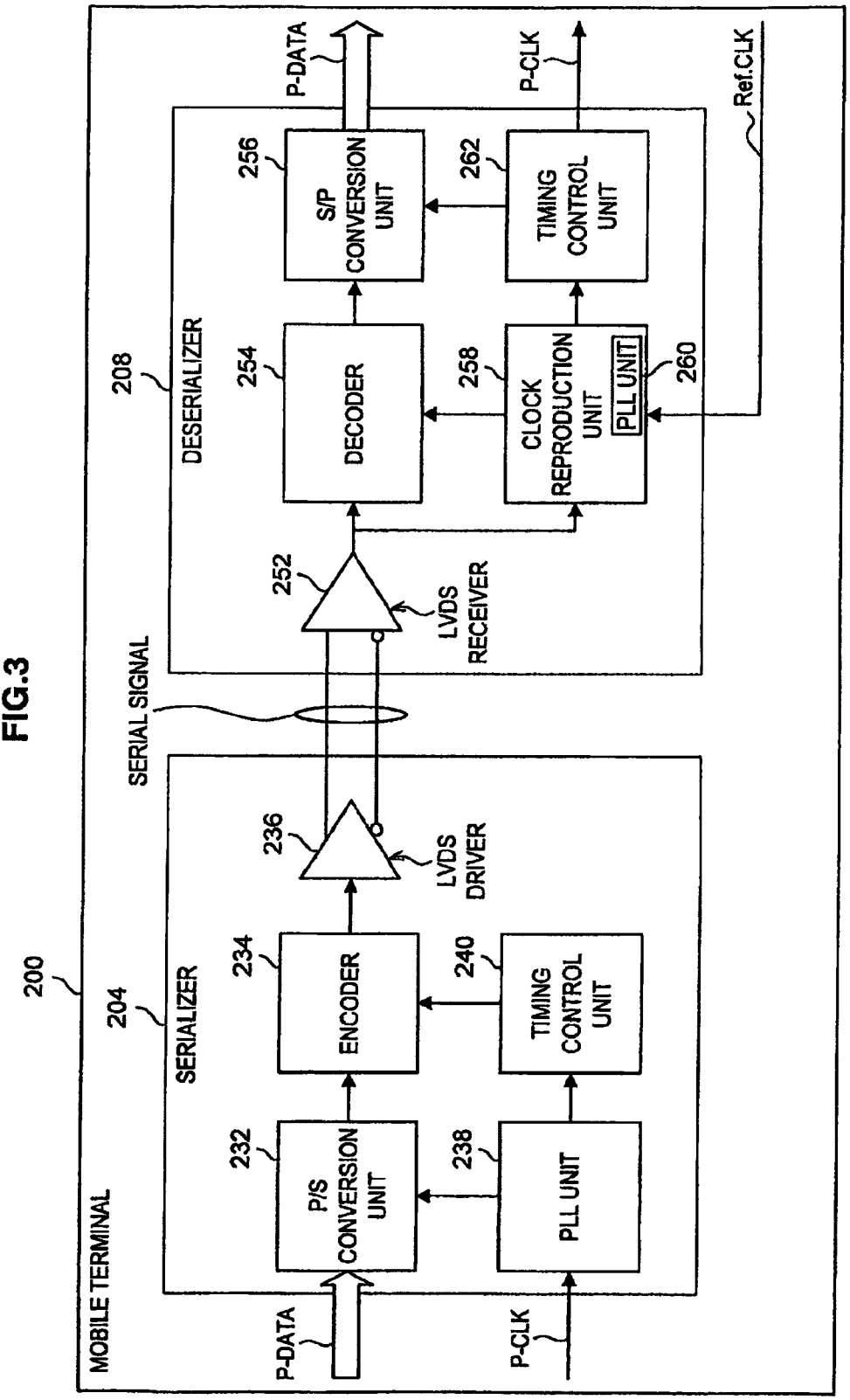
FIG. 3 is an explanatory view showing a function configuration example of the mobile terminal according to serial transmission.

Here, the function configuration of the mobile terminal 200 in which the serial transmission method is adopted will be described with reference to FIG. 3. FIG. 3 is an explanatory view showing a function configuration example of the mobile terminal 200 in which the serial transmission method is adopted. However, FIG. 3 is an explanatory view illustrated by focusing on the function configuration of the serializer 204 and the deserializer 208 and omits an illustration of other components.

(Serializer 204)

As shown in FIG. 3, the serializer 204 includes a P/S conversion unit 232, an encoder 234, an LVDS driver 236, a PLL unit 238, and a timing control unit 240.

As shown in FIG. 3, parallel signals (P-DATA) and a clock for parallel signals (P-CLK) are input from the baseband processor 110 into the serializer 204. The parallel signals input into the serializer 204 are converted into a serial signal by the P/S conversion unit 232. The serial signal converted by the P/S conversion unit 232 is input into the encoder 234. The encoder 234 adds a header and the like to the serial signal and then inputs the serial signal into the LVDS driver 236. The LVDS driver 236 transmits the input serial signal to the deserializer 208 by the differential transmission method based on LVDS.

The clock for parallel signals input into the serializer 204, on the other hand, is input into the PLL unit 238. The PLL unit 238 generates a clock for serial signal from the clock for parallel signals and inputs the clock for serial signal into the P/S conversion unit 232 and the timing control unit 240. The timing control unit 240 controls transmission timing of a serial signal by the encoder 234 based on the input clock for serial signal.

(Deserializer 208)

As shown in FIG. 3, the deserializer 208 mainly includes an LVDS receiver 252, a decoder 254, an S/P conversion unit 256, a clock reproduction unit 258, a PLL unit 260, and a timing control unit 262.

As shown in FIG. 3, a serial signal is transmitted from the serializer 204 to the deserializer 208 by the differential transmission method based on LVDS. The serial signal is received by the LVDS receiver 252. The serial signal received by the LVDS receiver 252 is input into the decoder 254 and the clock reproduction unit 258. The decoder 254 detects a head part of data by referencing the header of the input serial signal and inputs the serial signal into the S/P conversion unit 256. The S/P conversion unit 256 converts the input serial signal into parallel signals (P-DATA). The parallel signals converted by the S/P conversion unit 256 are output to the liquid crystal unit 104.

The clock reproduction unit 258, on the other hand, references a reference clock input from outside to reproduce a clock for parallel signals from the clock for serial signal using the built-in PLL unit 260. The clock for parallel signals reproduced by the clock reproduction unit 258 is input into the decoder 254 and the timing control unit 262. The timing control unit 262 controls reception timing based on the clock for parallel signals input from the clock reproduction unit 258. The clock for parallel signals (P-CLK) input into the timing control unit 262 is output to the liquid crystal unit 104.

Thus, parallel signals (P-DATA) and a clock for parallel signals (P-CLK) input from the baseband processor 110 into the serializer 204 are transmitted to the deserializer 208 after being converted into serial signals. Then, the input serial signals are restored to the original parallel signals and clock for parallel signals by the deserializer 208 before being output to the liquid crystal unit 104.

By transmitting parallel signals after being converted into a serial signal like the mobile terminal 200 described above, the transmission line thereof is serialized. As a result, the movable range of a portion in which the serial signal line is arranged is extended, improving flexibility concerning arrangement of the display unit 102. Thus, for example, the mobile terminal 200 can be modified so that, when a TV program is viewed using the mobile terminal 200, the arrangement of the display unit 102 is wide when viewed from a user. With such improved flexibility, usages of the mobile terminal 200 increase, creating, in addition to various functions as a communication terminal, various forms of use such as viewing of images and music.

Against the background described above, the liquid crystal unit 104 of the mobile terminal 200 is becoming ever denser to enable a finer display so that more information is displayed with smaller letters and images. However, such smaller letters and images are more difficult to view for users. Thus, there is a user desire to output letters and images displayed in the liquid crystal unit 104 of the mobile terminal 200 to a large screen such as a TV set and display device installed outside. In response to such a desire, an output form like mobile terminals 300 shown in FIG. 4A has been proposed. The output form will be briefly described below.

APPLICATION EXAMPLE 1

External Output System Using Electromagnetic Coupling

Figure 4A:
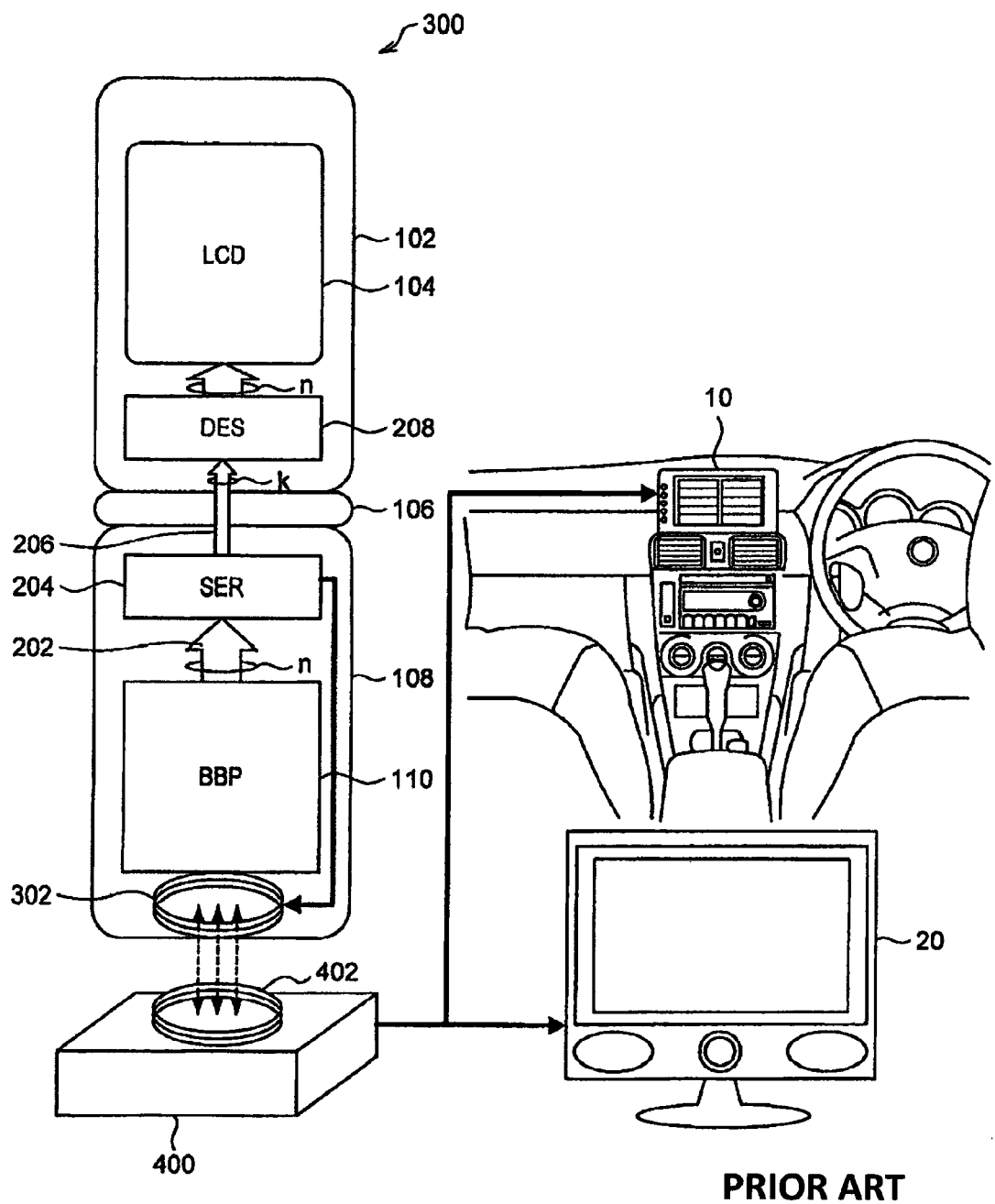
FIG. 4A is an explanatory view showing a configuration example of the mobile terminal.

First, FIG. 4A is referenced. FIG. 4A is an explanatory view showing a configuration example of the mobile terminal 300 capable of transmitting data such as images to an external output device using electromagnetic coupling. The external output device includes, for example, a car navigation system 10 and a TV set 20. In addition, a display device of a personal computer and a projector projecting images on a screen are also examples of the external output device.

A signal reader 400 as shown in FIG. 4A, for example, is used to transmit data such as images to such an external output device. The signal reader 400 is connected, for example, to the car navigation system 10 or the TV set 20, or contained in such a device. A signal is transmitted between the mobile terminal 300 and the signal reader 400 by using electromagnetic coupling. Thus, the mobile terminal 300 is provided with a coil 302. Further, the signal reader 400 is provided with a coil 402.

For example, an operation when an image signal is transmitted from the mobile terminal 300 to the TV set 20 will be considered. The mobile terminal 300 first generates parallel signals for parallel transmission of an image signal by the baseband processor 110. Then, the parallel signals are transmitted to the serializer 204 via the parallel signal line 202. The serializer 204 converts the transmitted parallel signals into a serial signal and transmits the serial signal to the serial signal line 206. At this point, a current signal corresponding to the serial signal is applied to the coil 302 so that an electromagnetic field is generated by the coil 302. Then, a current is generated in the coil 402 of the signal reader 400 by being induced by the electromagnetic field and the serial signal is demodulated by this current.

Thus, a serial signal corresponding to an image signal is transmitted between the mobile terminal 300 and the signal reader 400 using electromagnetic coupling. Naturally, the serial signal is encoded by a predetermined coding mode and modulated by a predetermined modulation method such as ASK (Amplitude Shift Keying) before being transmitted. However, a signal encoded by the NRZ coding mode contains a DC component and thus is not appropriate for transmission using electromagnetic coupling. Thus, the Manchester coding mode or the like in which a signal encoded thereby does not contain any DC component is used for transmission using electromagnetic coupling.

In the case of the example shown in FIG. 4A, a serial signal is encoded by the serializer 204 according to the Manchester coding mode and transmitted using electromagnetic coupling. In this case, the signal reader 400 naturally supports demodulation according to the Manchester coding mode. Therefore, after receiving the encoded signal, the signal reader 400 demodulates the signal into a serial signal and then, converts the serial signal into parallel signals, which are output to the TV set 20 or the like. When the Manchester code is used, "1" is transmitted as "10" and "0" as "01" and thus, compared with a system in which "1" and "0" are simply transmitted as they are, two times the transmission speed is necessary. However, Manchester code contains no DC component and is easy to extract a clock from and thus, is appropriate for signal transmission using electromagnetic coupling.

Figure 4B:
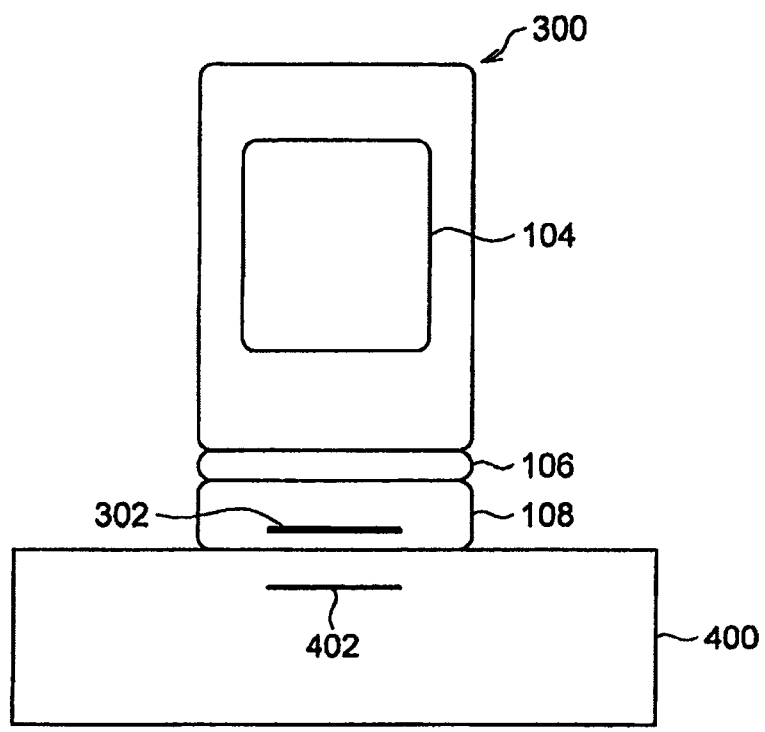
FIG. 4B is an explanatory view showing a contact state between the mobile terminal and a signal reader.

Incidentally, when the mobile terminal 300 and the signal reader 400 are close to each other, as shown in FIG. 4B, signal transmission is realized. Such a form of communication may be called non-contact communication. In the example in FIG. 4B, the mobile terminal 300 is placed with the display unit 102 open, but the mobile terminal 300 may also be placed with the display unit 102 closed. Normally, when the display unit 102 of the mobile terminal 300 is closed, power to the liquid crystal unit 104 is frequently turned off, contributing to power saving. At this point, a mode is set in which data can be transmitted to external output even if the mobile terminal 300 is closed.

(Function Configuration: Mobile Terminal 300)

Figure 5:
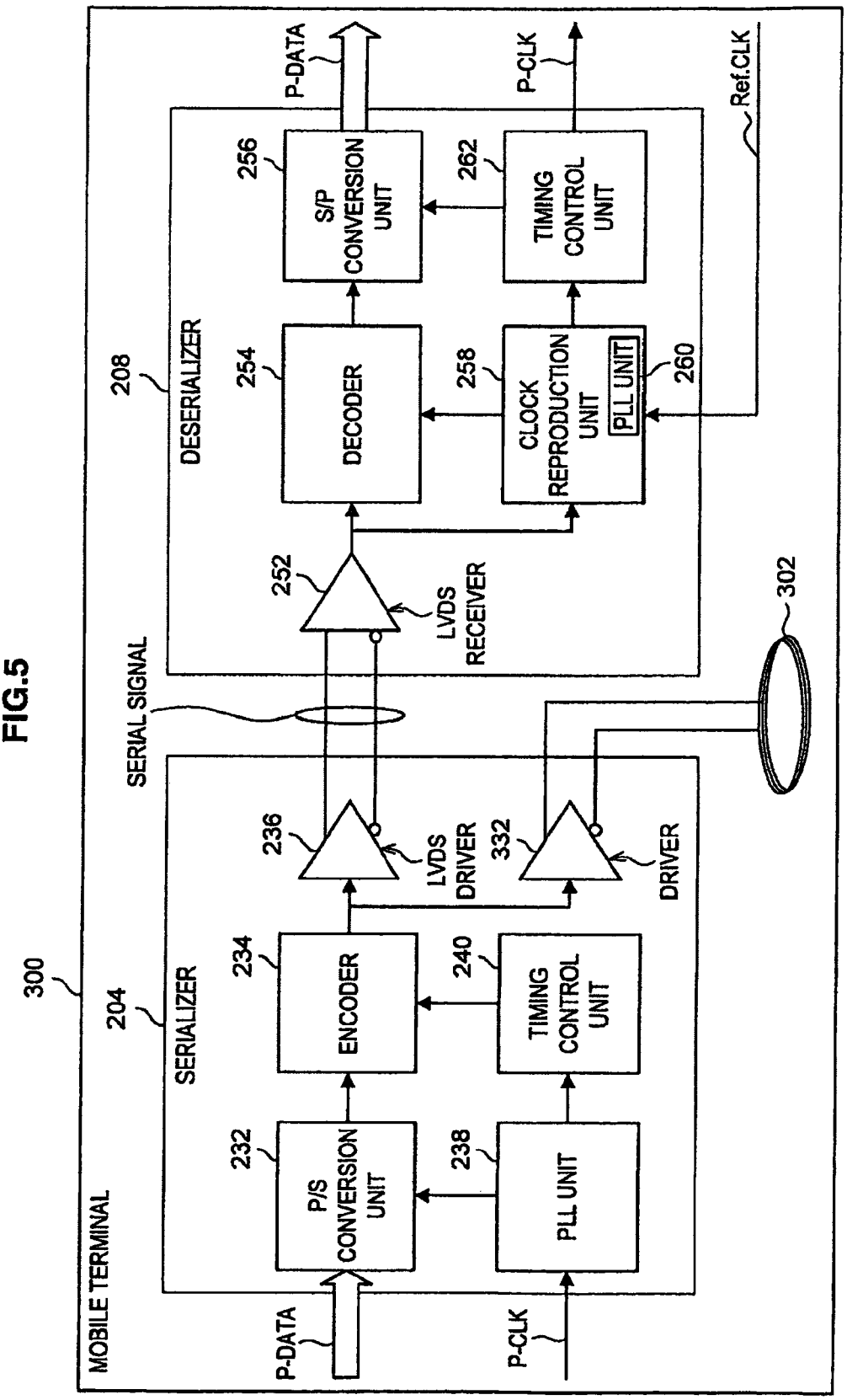
FIG. 5 is an explanatory view showing a function configuration example of the mobile terminal according to serial transmission.

Here, the function configuration of the mobile terminal 300 will be briefly described with reference to FIG. 5. FIG. 5 is an explanatory view showing a function configuration example of the mobile terminal 300. However, FIG. 5 is an explanatory view illustrated by focusing on the function configuration of the serializer 204 and the deserializer 208 and omits an illustration of other components. Moreover, the same reference numerals are attached, among components of the mobile terminal 300, to components having substantially the same function configuration as those of the mobile terminals 200 to omit a detailed description thereof.

(Serializer 204)

As shown in FIG. 5, the serializer 204 includes the P/S conversion unit 232, the encoder 234, the LVDS driver 236, the PLL unit 238, the timing control unit 240, and a driver 332.

As shown in FIG. 5, parallel signals (P-DATA) and a clock for parallel signals (P-CLK) are input from the baseband processor 110 into the serializer 204. The parallel signals input into the serializer 204 are converted into a serial signal by the P/S conversion unit 232. The serial signal converted by the P/S conversion unit 232 is input into the encoder 234. The encoder 234 adds a header and the like to the serial signal and encodes the serial signal by the Manchester coding mode and then, inputs the serial signal into the LVDS driver 236 and the driver 332. The LVDS driver 236 transmits the input serial signal to the deserializer 208 by the differential transmission method based on LVDS. The driver 332, on the other hand, transmits the input serial signal to the signal reader 400 using electromagnetic coupling by the coil 302.

The clock for parallel signals input into the serializer 204, on the other hand, is input into the PLL unit 238. The PLL unit 238 generates a clock for serial signal from the clock for parallel signals and inputs the clock for serial signal into the P/S conversion unit 232 and the timing control unit 240. The timing control unit 240 controls transmission timing of a serial signal by the encoder 234 based on the input clock for serial signal.

(Deserializer 208)

As shown in FIG. 5, the deserializer 208 mainly includes the LVDS receiver 252, the decoder 254, the S/P conversion unit 256, the clock reproduction unit 258, the PLL unit 260, and the timing control unit 262.

As shown in FIG. 5, a serial signal is transmitted from the serializer 204 to the deserializer 208 by the differential transmission method based on LVDS. The serial signal is received by the LVDS receiver 252. The serial signal received by the LVDS receiver 252 is input into the decoder 254 and the clock reproduction unit 258. The decoder 254 detects a head part of data by referencing the header of the input serial signal and decodes the serial signal encoded by the Manchester coding mode and then, inputs the serial signal into the S/P conversion unit 256. The S/P conversion unit 256 converts the input serial signal into parallel signals (P-DATA). The parallel signals converted by the S/P conversion unit 256 are output to the liquid crystal unit 104.

The clock reproduction unit 258, on the other hand, references a reference clock input from outside to reproduce a clock for parallel signals from the clock for serial signal using the built-in PLL unit 260. The clock for parallel signals reproduced by the clock reproduction unit 258 is input into the decoder 254 and the timing control unit 262. The timing control unit 262 controls reception timing based on the clock for parallel signals input from the clock reproduction unit 258. The clock for parallel signals (P-CLK) input into the timing control unit 262 is output to the liquid crystal unit 104.

Thus, parallel signals (P-DATA) and a clock for parallel signals (P-CLK) input from the baseband processor 110 into the serializer 204 are transmitted to the deserializer 208 after being converted into serial signals. Then, the input serial signals are restored to the original parallel signals and clock for parallel signals by the deserializer 208 before being output to the liquid crystal unit 104.

(Function Configuration: Signal Reader 400)

Next, the function configuration of the signal reader 400 will be briefly described with reference to FIG. 6. FIG. 6 is an explanatory view showing a function configuration example of the signal reader 400.

As shown in FIG. 6, the signal reader 400 mainly includes the coil 402, a differential receiver 432, an amplifier 434, a decoder 436, an S/P conversion unit 438, an interface 440, a clock reproduction unit 442, a PLL unit 444, and a timing control unit 446.

As described above, a serial signal is transmitted from the mobile terminals 300 to the signal reader 400 using electromagnetic coupling. The serial signal is received by the differential receiver 432 using the coil 402. The differential receiver 432 inputs the received serial signal into the amplifier 434. The amplifier 434 is provided to amplify the signal level of the serial signal lowered by signal transmission using electromagnetic coupling. The serial signal amplified by the amplifier 434 is input into the decoder 436 and the clock reproduction unit 442.

The decoder 436 detects the head part of data by referencing the header of the input serial signal and decodes the serial signal encoded by the Manchester coding mode and then, inputs the serial signal into the S/P conversion unit 438. The S/P conversion unit 438 converts the input serial signal into parallel signals (P-DATA). The parallel signals converted by the S/P conversion unit 438 are input into the interface 440.

The clock reproduction unit 442, on the other hand, references a reference clock input from outside to reproduce a clock for parallel signals from the clock for serial signal using the built-in PLL unit 444. The clock for parallel signals reproduced by the clock reproduction unit 442 is input into the decoder 436 and the timing control unit 446. The timing control unit 446 controls reception timing based on the clock for parallel signals input from the clock reproduction unit 442. The clock for parallel signals (P-CLK) input into the timing control unit 446 is input into the interface 440.

The interface 440 converts and outputs the input parallel signals and clock for parallel signals into signals compatible with an external output device. For example, the interface 440 converts the input parallel signals into an analog RGB signal or DVI signal (Digital Visual Interface signal) and outputs the signal to the car navigation system 10, the TV set 20 or the like.

In the foregoing, the function configurations of the mobile terminal 300 and the signal reader 400 have been described. Thanks to such functions, the user can easily output an image and the like to an external display device by simply placing the mobile terminal 300 on the signal reader 400. Thus, an image and the like from the mobile terminal 300 can be output to a large screen. As a result, in addition to using the mobile terminal 300 as merely a personal communication device or the like, for example, the mobile terminal 300 can be caused to function as a TV phone used by a large number of people.

APPLICATION EXAMPLE 2

Data Transmission Method Using a Power Supply Line

The mobile terminal 300 uses the Manchester coding mode containing no direct-current component as the coding mode. Such an encoded signal containing no direct-current component can be transmitted by superimposing the encoded signal on a power supply. Thus, a technology to apply the power supply line transmission method to the mobile terminal 300 will be described. The mobile terminal 500 is a configuration example using this technology.

(Function Configuration)

Figure 7A:
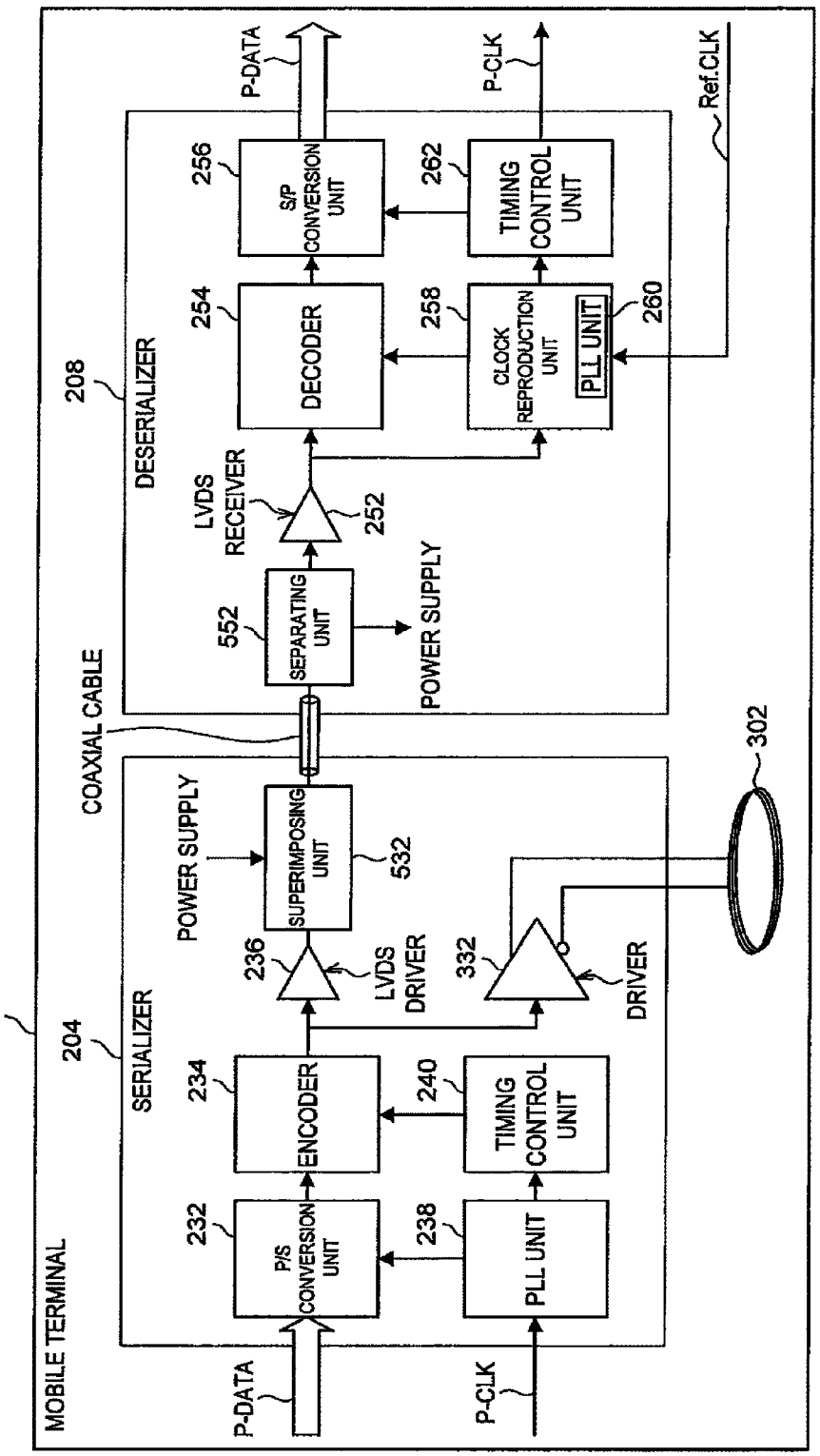
FIG. 7A is an explanatory view showing a function configuration example of the mobile terminal according to serial transmission.

First, the function configuration of the mobile terminal 500 capable of transmitting data using a power supply line will be described with reference to FIG. 7A. FIG. 7A is an explanatory view showing a function configuration example of the mobile terminal 500 capable of transmitting data using a power supply line. However, FIG. 7A is an explanatory view illustrated by focusing on the function configuration of the serializer 204 and the deserializer 208 and omits an illustration related to other components. Moreover, the same reference numerals are attached, among components of the mobile terminal 500, to components having substantially the same function configuration as those of the mobile terminals 300 to omit a detailed description thereof.

(Serializer 204)

As shown in FIG. 7A, the serializer 204 includes the P/S conversion unit 232, the encoder 234, the LVDS driver 236, the PLL unit 238, the timing control unit 240, the driver 332, and a superimposing unit 532. The superimposing unit 532 is an example of a signal superimposing unit.

As shown in FIG. 7A, parallel signals (P-DATA) and a clock for parallel signals (P-CLK) are input from the baseband processor 110 into the serializer 204. The parallel signals input into the serializer 204 are converted into a serial signal by the P/S conversion unit 232. The serial signal converted by the P/S conversion unit 232 is input into the encoder 234. The encoder 234 adds a header and the like to the serial signal and encodes the serial signal by a method without (or with a small amount of) a direct-current component such as the Manchester coding mode and then, inputs the serial signal into the LVDS driver 236 and the driver 332.

The LVDS driver 236 converts the input serial signal into an LVDS and then inputs the LVDS into the superimposing unit 532. The superimposing unit 532 transmits the signal input from the LVDS driver 236 to the deserializer 208 by superimposing the signal on the power supply line. For example, the superimposing unit 532 couples the signal by a capacitor and the power supply by a choke coil. In the power supply line, a coaxial cable, for example, is used as a transmission line. The power supply line is a line provided to supply power from the operation unit 108 to the display unit 102. The driver 332, on the other hand, transmits the input serial signal to the signal reader 400 using electromagnetic coupling to the coil 302.

Incidentally, the clock for parallel signals input into the serializer 204 is input into the PLL unit 238. The PLL unit 238 generates a clock for serial signal from the clock for parallel signals and inputs the clock for serial signal into the P/S conversion unit 232 and the timing control unit 240. The timing control unit 240 controls transmission timing of a serial signal by the encoder 234 based on the input clock for serial signal.

(Deserializer 208)

As shown in FIG. 7A, the deserializer 208 mainly includes the LVDS receiver 252, the decoder 254, the S/P conversion unit 256, the clock reproduction unit 258, the PLL unit 260, the timing control unit 262, and a separating unit 552. The separating unit 552 is an example of a signal separating unit.

As shown in FIG. 7A, a signal in which a power supply and a serial signal are superimposed is transmitted to the deserializer 208 through a power supply line (coaxial cable). The frequency spectrum of the superimposed signal is as shown in FIG. 7B. As shown in FIG. 7B, it is clear that the frequency spectrum of Manchester code has no direct-current component and thus can be transmitted together with the power supply (DC).

FIG. 7A is referenced again. The superimposed signal is separated into a serial signal and a power supply by the separating unit 552. For example, the separating unit 552 extracts a serial signal by cutting a direct-current component by a capacitor and a power supply by cutting high-frequency components by a choke coil. The serial signal separated by the separating unit 552 is received by the LVDS receiver 252.

The serial signal received by the LVDS receiver 252 is input into the decoder 254 and the clock reproduction unit 258. The decoder 254 detects a head part of data by referencing the header of the input serial signal and decodes the serial signal encoded by the Manchester coding mode or the like and then, inputs the serial signal into the S/P conversion unit 256. The S/P conversion unit 256 converts the input serial signal into parallel signals (P-DATA). The parallel signals converted by the S/P conversion unit 256 are output to the liquid crystal unit 104.

The clock reproduction unit 258, on the other hand, references a reference clock input from outside to reproduce a clock for parallel signals from the clock for serial signal using the built-in PLL unit 260. The clock for parallel signals reproduced by the clock reproduction unit 258 is input into the decoder 254 and the timing control unit 262. The timing control unit 262 controls reception timing based on the clock for parallel signals input from the clock reproduction unit 258. The clock for parallel signals (P-CLK) input into the timing control unit 262 is output to the liquid crystal unit 104.

In this manner, the mobile terminals 500 can transmit a power supply and a serial signal (such as a video signal) by one coaxial cable. Thus, only one cable connects the operation unit 108 and the display unit 102 so that movability of the display unit 102 is improved and the mobile terminals 500 can be transformed into complex shapes. As a result, usages of the mobile terminals 500 are increased and the convenience of users is improved.

(Summary of Issues)

As described above, the parallel transmission method is inconvenient for freely changing the relative positional relationship between the operation unit 108 and the display unit 102. Thus, the serializer 204 and the deserializer 208 are provided like the mobile terminal 200 to enable serial transmission of a video signal and the like and to extend the movable range of the display unit 102. Further, an issue that the convenience of users is degraded because the size of letters and images displayed in the liquid crystal unit 104 is small is solved, like the mobile terminal 300, by enabling output to an external large screen using electromagnetic coupling. Further, by making use of features of the coding mode used for the mobile terminal 300, movability of the display unit 102 is still improved by using a method by which a signal is superimposed on a power supply line for transmission.

As a matter of fact, as shown in FIGS. 3, 5, 6, and 7A, the PLL unit 260 or 444 (hereinafter, the PLL) is used in the mobile terminals 200, 300, and 500 and the signal reader 400 to reproduce the clock of a received serial signal. The PLL is necessary to extract the clock from a signal encoded by the Manchester coding mode or the like. However, power consumption of the PLL itself is not low and providing the PLL increases power consumption of the mobile terminals 200, 300, and 500 and the signal reader 400 by that amount. Such an increase in power consumption poses a very serious issue for a terminal device such as a mobile phone. Against the background of such an issue, technology that eliminates the need for the PLL on the side of the deserializer 208 and the signal reader 400 is demanded. Thus, a coding technology that eliminates the need for the PLL for clock reproduction will be proposed in an embodiment shown below.

<Embodiment>

An embodiment of the present invention will be described. The present embodiment relates to a coding mode containing no direct-current component and capable of reproducing the clock without using the PLL. Thus, the AMI (Alternative Mark Inversion) code that forms the foundation to describe the coding mode will be briefly described and then, the function configuration of the mobile terminal 600 according to the present embodiment and the coding mode will be described.

(Signal Waveform of AMI Code)

First, a signal waveform of AMI code and features thereof will be briefly described with reference to FIG. 8. FIG. 8 is an explanatory view showing an example of the signal waveform of AMI code. However, it is assumed in the description below that A is any positive number.

The AMI code is a code that represents data 0 as the potential 0 and data 1 as the potential A or −A. However, the potential A and the potential −A are alternately repeated. That is, if data 1 appears after the potential A is represented by data 1, the data 1 is represented by the potential −A. Since data is represented by repeating polarity reversal in this manner, the AMI code does not contain any direct-current component. A partial response method represented, for example, by PR (1, −1) is known as code having features of the same type as the AMI code. Such a transmission code using polarity reversal is called bipolar code. In addition, a dicode mode can also be used. Here, an example of AMI code with 100% duty will be taken for a description that follows.

FIG. 8 schematically shows an AMI code of bit intervals TI, T2, . . . , T14. In FIG. 8, data 1 appears in bit intervals T2, T4, TS, TIO, TII, TI2, and T14. If the potential in the bit interval T2 is A, the potential in the bit interval T4 becomes −A. The potential in the bit interval TS becomes A. In this manner, the amplitude corresponding to data 1 is alternately reversed to the positive and negative sides. This is the polarity reversal described above.

Data 0, on the other hand, is all represented by the potential 0. With representations described above, the AMI code does not contain any direct-current component, but as observed in the bit intervals T6, . . . , T9 in FIG. 8, the potential 0 may appear consecutively. If the potential 0 continues in this manner, there is an issue that is it very difficult to extract a clock component from such a signal waveform without using the PLL. Thus, the present embodiment proposes a technology to cause AMI code (and code having features equivalent thereto) to include a clock component.

[Function Configuration of Mobile Terminal 600]

Figure 9:
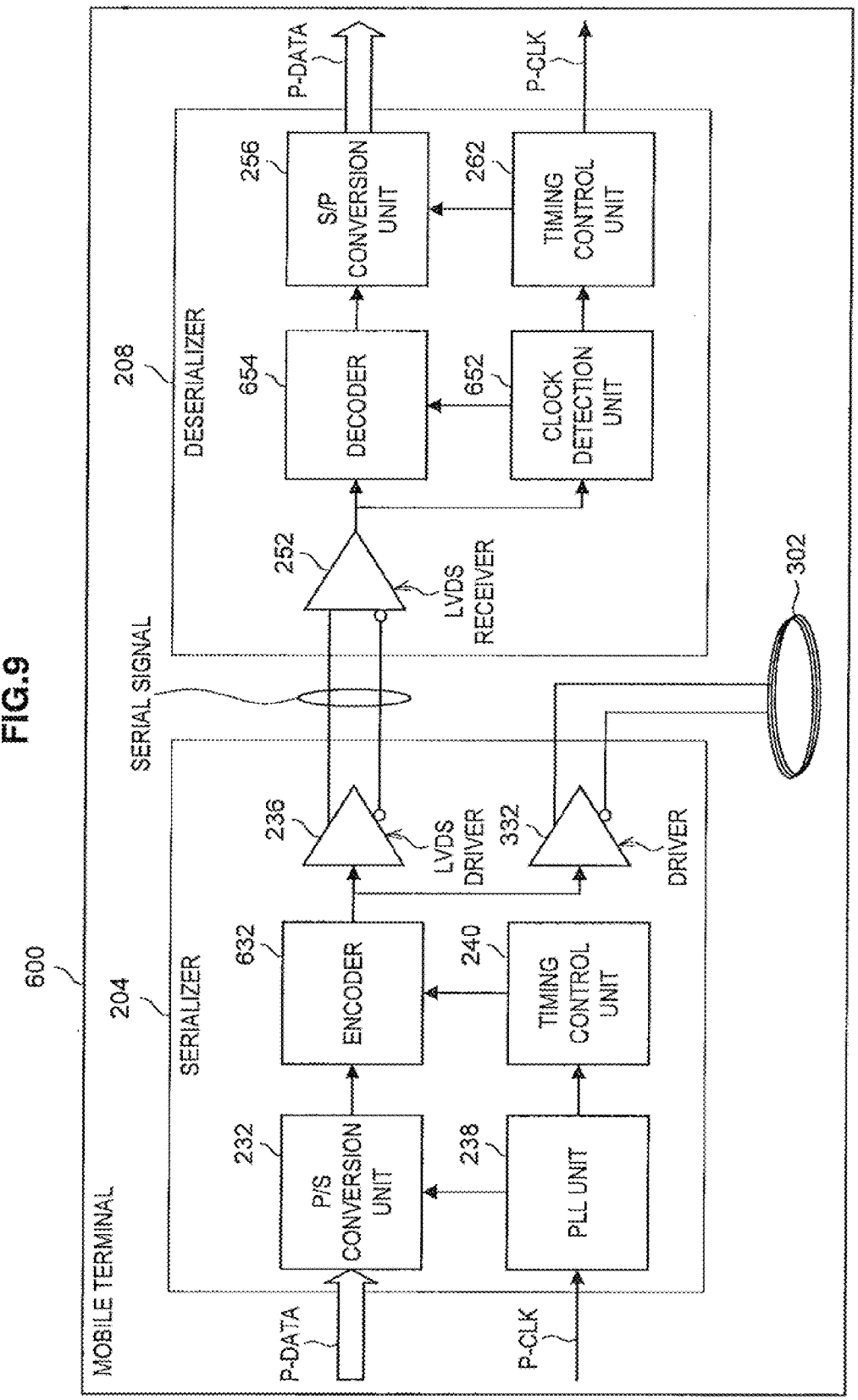
FIG. 9 is an explanatory view showing a function configuration example of the mobile terminal according to an embodiment of the present invention.

First, the function configuration of the mobile terminal 600 according to the present embodiment will be described with reference to FIG. 9. FIG. 9 is an explanatory view showing a function configuration example of the mobile terminal 600 according to the present embodiment. However, FIG. 9 is an explanatory view illustrated by focusing on the function configuration of the serializer 204 and the deserializer 208 and omits an illustration related to other components. Moreover, the same reference numerals are attached, among components of the mobile terminal 600, to components having substantially the same function configuration as those of the mobile terminals 300 to omit a detailed description thereof.

(Serializer 204)

As shown in FIG. 9, the serializer 204 includes the P/S conversion unit 232, the LVDS driver 236, the PLL unit 238, the timing control unit 240, the driver 332, and an encoder 632. A major difference from the mobile terminal 300 lies in the function of the encoder 632. The encoder 632 is an example of an encoding unit and a transmission unit.

As shown in FIG. 9, parallel signals (P-DATA) and a clock for parallel signals (P-CLK) are input from the baseband processor 110 into the serializer 204. The parallel signals input into the serializer 204 are converted into a serial signal by the P/S conversion unit 232. The serial signal converted by the P/S conversion unit 232 is input into the encoder 632. The encoder 632 adds a header and the like to the serial signal and encodes the serial signal by a predetermined coding mode.

Figure 10:
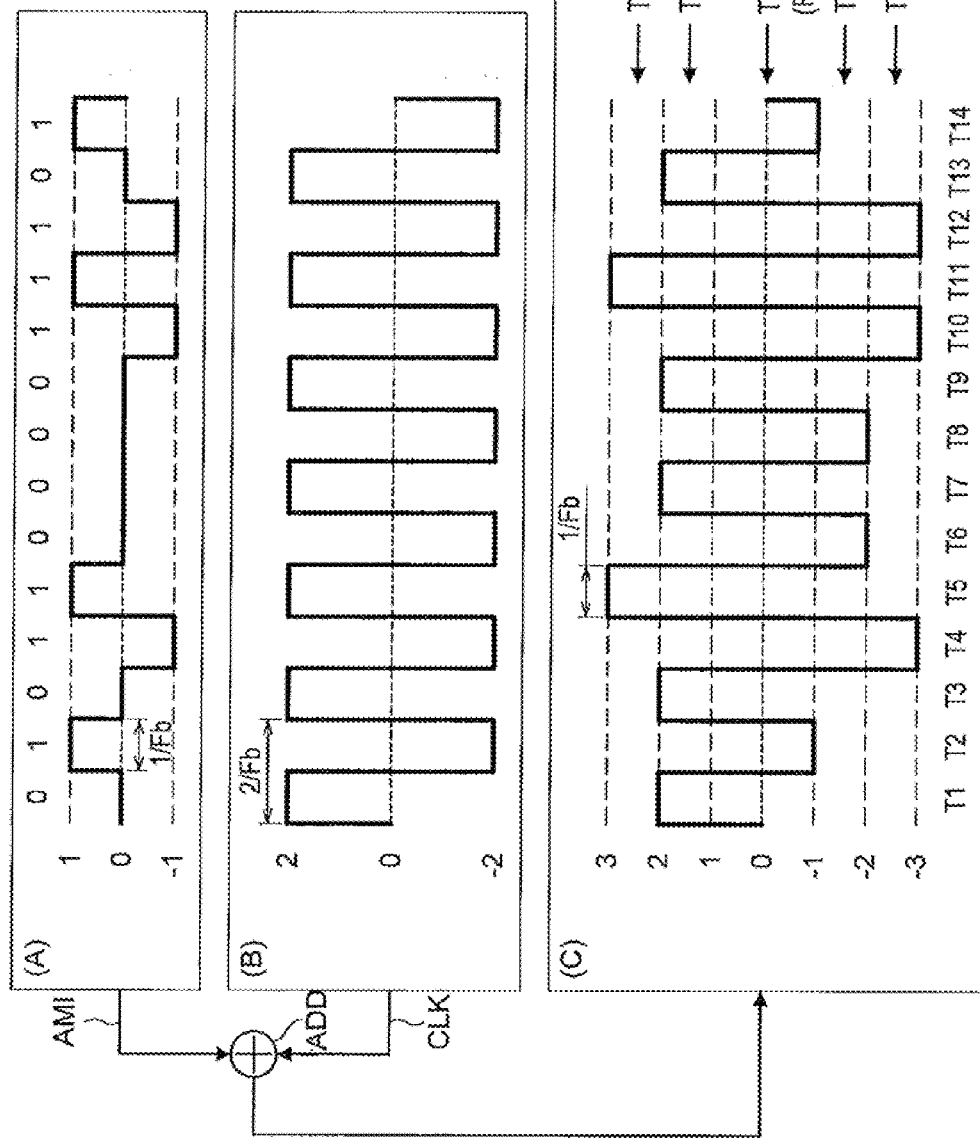
FIG. 10 is an explanatory view showing a signal generation method according to the embodiment.

Here, a generation method of encoded signal by the encoder 632 will be described with reference to FIG. 10. FIG. 10 is an explanatory view showing an example of the coding mode according to the present embodiment. While FIG. 10 shows a generation method of code based on AMI code, the present embodiment is not limited to this and may be applied to code having features similar to those of the AMI code. For example, the present embodiment may be applied to bipolar code or PR (1, −1) code.

The signal shown in FIG. 10C is a signal encoded by a coding mode according to the present embodiment. This signal represents data 1 by a plurality of potentials A1 (−1, −3, 1, 3) and data 0 by a plurality of potentials A2 (−2, 2) that are different from the potentials A1. However, the signal is configured to undergo polarity reversal and also not to consecutively remain at the same potential. For example, if a section where data 0 continues in the bit intervals T6, . . . , T9 is referenced, the potential changes like −2, 2, −2, and 2. By using such code, a clock component can be reproduced by detecting both rise and fall edges even if the same data value consecutively appears.

The encoder 632 is provided with an adder ADD to generate code described above. The adder ADO is an example of a clock addition unit. As shown in FIG. 10, for example, the encoder 632 encodes an input serial signal into an AMI code (A) and inputs the AMI code into the adder ADD. Further, the encoder 632 generates a clock (B) having a frequency (Fb/2) half the transmission speed Fb of the AMI code and inputs the clock into the adder ADD. However, the clock amplitude is assumed to be N times (N>1; N=2 in the example in FIG. 10) the AMI code. Then, the encoder 632 adds the AMI code and the clock through the adder ADD to generate a code (C). At this point, the AMI code and the clock are synchronized and edges are aligned before the AMI code and the clock being added.

FIG. 9 is referenced again. The serial signal encoded by the encoder 632 is input into the LVDS driver 236 and the driver 332. The LVDS driver 236 transmits the input serial signal to the deserializer 208 by the differential transmission method based on LVDS. The driver 332, on the other hand, transmits the input serial signal to the signal reader 400 using electromagnetic coupling by the coil 302.

The clock for parallel signals input into the serializer 204, on the other hand, is input into the PLL unit 238. The PLL unit 238 generates a clock for serial signal from the clock for parallel signals and inputs the clock for serial signal into the P/S conversion unit 232 and the timing control unit 240. The timing control unit 240 controls transmission timing of a serial signal by the encoder 632 based on the input clock for serial signal.

(Deserializer 208)

As shown in FIG. 9, the deserializer 208 mainly includes the LVDS receiver 252, the S/P conversion unit 256, the timing control unit 262, a clock detection unit 652, and an decoder 654. A major difference from the mobile terminal 300 is that the clock detection unit 652 without the PLL is contained. The decoder 654 is an example of a bit value identification unit.

As shown in FIG. 9, a serial signal is transmitted from the serializer 204 to the deserializer 208 by the differential transmission method based on LVDS. The serial signal is received by the LVDS receiver 252. The serial signal received by the LVDS receiver 252 is input into the decoder 654 and the clock detection unit 652. The decoder 654 detects a head part of data by referencing the header of the input serial signal and decodes the serial signal encoded by the coding mode used by the encoder 632.

Here, a decoding method by the decoder 654 will be described with reference to FIG. 10. As described above, a serial signal is encoded in the format shown in FIG. 10C by the encoder 632. Thus, the original serial signal can be decoded by the decoder 654 by determining whether the amplitude of the signal is A1 or A2.

Four threshold values (L1, L2, L3, and L4) shown in FIG. 10C are used to determine the amplitudes A1 (−1, −3, 1, 3) corresponding to data 1 and the amplitudes A2 (−2, 2) corresponding to data 0. Naturally, a determination can be made by two threshold values if values obtained by reflecting to the negative side or positive side are determined by using an absolute value circuit. Thus, the decoder 654 determines whether the amplitude is A1 or A2 by comparing the amplitude of an input signal and the above four threshold values so that the original serial signal is decoded.

FIG. 9 is referenced again. The serial signal decoded by the decoder 654 is input into the S/P conversion unit 256. The S/P conversion unit 256 converts the input serial signal into parallel signals (P-DATA). The parallel signals converted by the S/P conversion unit 256 are output to the liquid crystal unit 104.

The clock detection unit 652, on the other hand, references a reference clock input from outside to detect a clock component from the input signal. As described above, a clock component can be detected based on the cycle of polarity reversal after determining amplitude polarity by comparing the amplitude and the threshold value L0 (potential 0) using the code shown in FIG. 10C. Therefore, the clock detection unit 652 can detect a clock component of a signal without using the PLL. As a result, power consumption of the deserializer 208 can be reduced.

FIG. 9 is referenced again. The clock detected by the clock detection unit 652 is input into the decoder 654 and the timing control unit 262. The timing control unit 262 controls reception timing based on the clock input from the clock detection unit 652. The clock (P-CLK) input into the timing control unit 262 is output to the liquid crystal unit 104.

Figure 11:
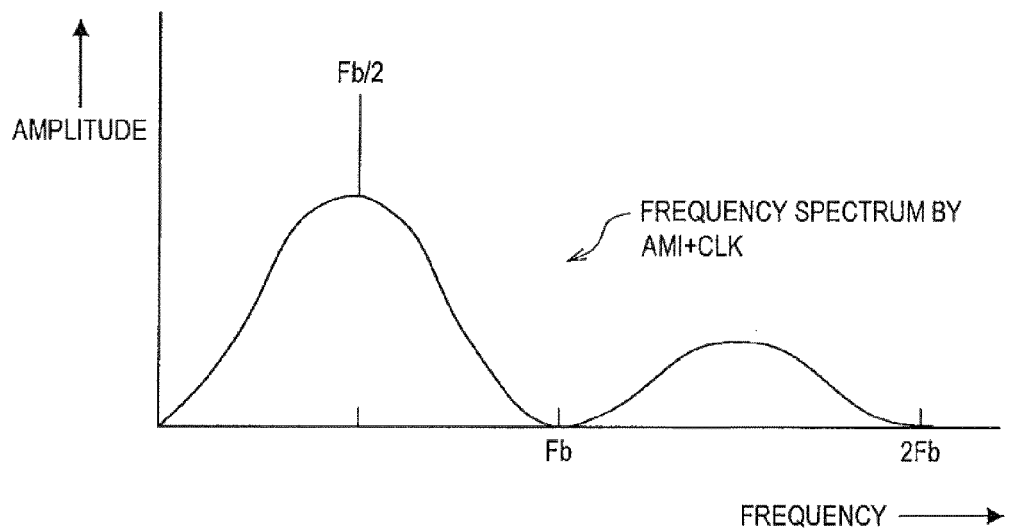
FIG. 11 is an explanatory view showing an example of the frequency spectrum of a signal according to the embodiment.

Thus, by using a code according to the present embodiment containing no direct-current component (see FIG. 11) and capable of reproducing a clock component from the cycle of polarity reversal, it becomes possible to detect the clock without using the PLL and significantly reduce power consumption of a mobile terminal. The frequency spectrum of a code according to the present embodiment has, for example, a shape shown in FIG. 11. A line spectrum appears at the frequency Fb/2 of the clock obtained by addition by the adder ADD of the encoder 632 and in addition, a broad frequency spectrum of AMI code appears. In this frequency spectrum, null points are present at frequencies Fb, 2Fb, 3Fb, . . . , .

This technology is applicable to the mobile terminals 200, 300, and 500 and the signal reader 400. That is, the technology is also applicable to electronic devices supporting the power supply line transmission method or the signal transmission method by electromagnetic coupling. If technology according to the present embodiment is applied to such devices, the PLL can be eliminated from the deserializer 208 mounted in each device. Therefore, it is needless to say that a configuration obtained by combining a portion of configuration of the mobile terminal 200, 300, or 500 or the signal reader 400 with the mobile terminal 600 according to the present embodiment belongs to the technical scope of the present embodiment.

[Hardware Configuration]

Figure 12:
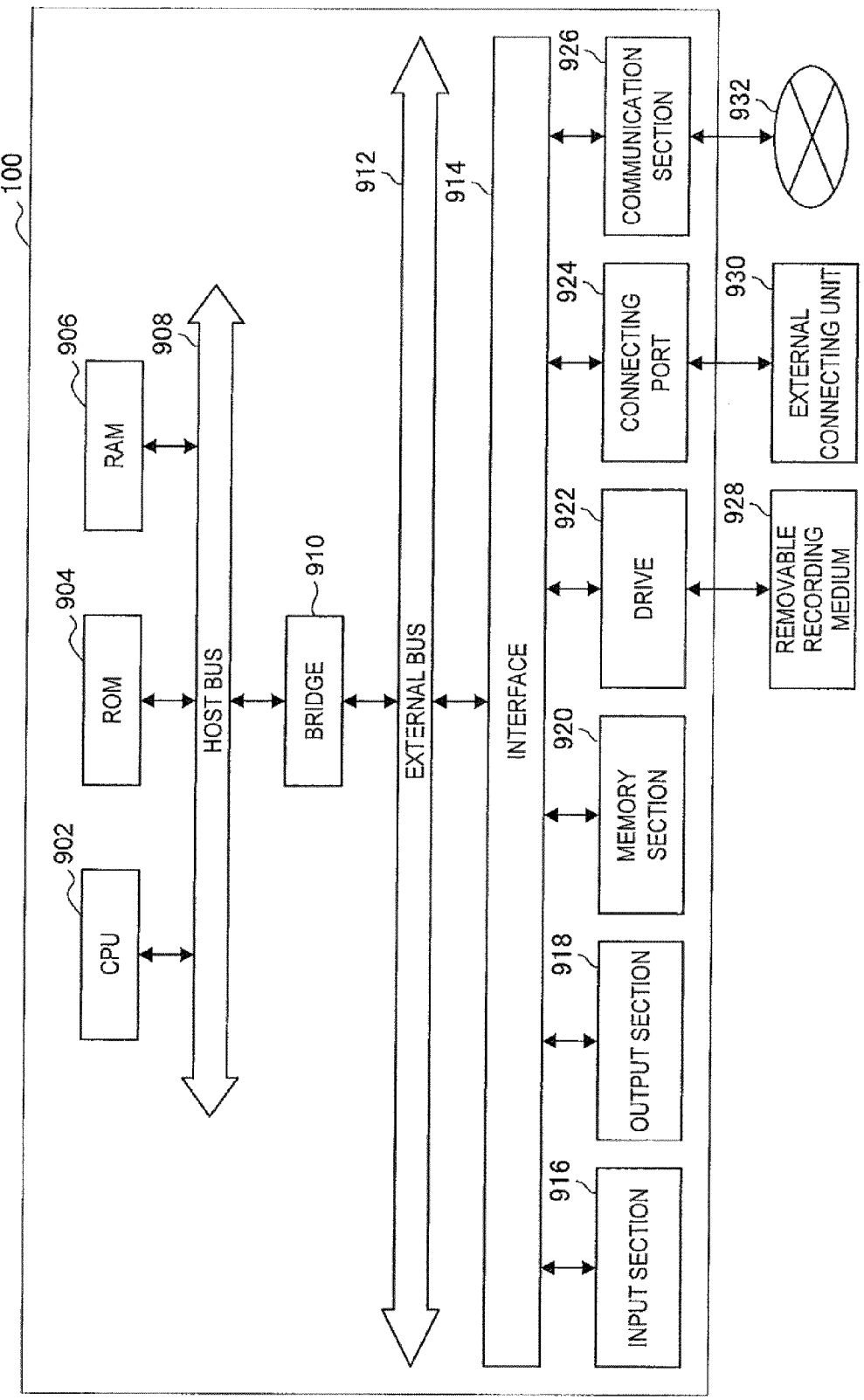
FIG. 12 is an explanatory view showing a hardware configuration example of an information processing apparatus such as the mobile terminal.

The functions of the constituent elements held by the terminal can be realized by an information processing apparatus having, for example, a hardware configuration shown in FIG. 12. FIG. 12 is a diagram for explaining a hardware configuration of an information processing apparatus which can realize the functions held by the constituent elements of the apparatus.

As shown in FIG. 12, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

It should be understood by those skilled in the art that various modifications, combinations, sub-combinations and alterations may occur depending on design and other factors insofar as they are within the scope of the appended claims or the equivalents thereof.

For example, the above embodiment is described by taking an example in which the AMI code is used as a code to be input into the adder ADD, but technology of the pre~ent invention is not limited to this. As described above, various kinds of bipolar code and PR (1, −1) code in the partial response method are used. Thus, coding formats using polarity reversal are suitably used, but in the first place, generating such code by a bit shift or the like can be considered. Therefore, some modifications concerning the generation method of code can be considered.

What is claimed is:

1. An information processing apparatus, comprising:
    an encoding unit for encoding input data containing mutually different first and second bit values into an encoded signal, wherein in the encoded signal,
        the first bit value is represented by a plurality of absolute first amplitude values,
        the second bit value is represented by a second amplitude value different from any of the first amplitude values,
        the first bit value does not take an identical first amplitude value consecutively, and
        a polarity of the first and second amplitude values is reversed for each cycle; and
    a transmission unit that transmits the encoded signal through a predetermined transmission line.

2. The information processing apparatus according to claim 1, wherein
    the encoding unit further comprises:
    a data encoding unit that encodes the input data into an encoded signal X of a transmission speed Fb in which the first bit value is represented as an amplitude 0 and the second bit value is represented as a repetition of amplitude values A and −A (A is any real number) and;
    a clock addition unit that adds a clock signal having an amplitude value n * A (n>1) and a frequency Fb/2 to the encoded signal X encoded by the data encoding unit to convert the encoded signal X into the encoded signal.

3. The information processing apparatus according to claim 2, wherein the encoded signal X is a bipolar code.

4. The information processing apparatus according to claim 3, wherein the encoded signal X is an AMI (Alternate Mark Inversion) code with 100% duty cycle.

5. The information processing apparatus according to claim 3, wherein the encoded signal X is a code of a partial response method.

6. The information processing apparatus according to claim 2, further comprising:
    a bit value identification unit that determines whether the amplitude value of an encoded signal transmitted through the predetermined transmission line is the first amplitude value or the second amplitude value and identifies the first bit value or the second bit value based on a result of the determination; and
    a clock detection unit that detects the reversal cycle of polarity held by the amplitude value of the encoded signal to detect a clock of the encoded signal based on the reversal cycle.

7. The information processing apparatus according to claim 6, further comprising:
    a signal superimposing unit that superimposes the encoded signal output by the encoding unit on a power supply signal to generate a superimposed signal and passes the superimposed signal to a power supply line; and
    a signal separating unit that separates the superimposed signal acquired from the power supply line into the encoded signal and the power supply signal and inputs the encoded signal into the bit value identification unit and the clock detection unit, wherein
    the power supply line is used as the predetermined transmission line.

8. A signal transmission method, comprising:
    encoding an input signal containing mutually different first and second bit values, the encoding further comprising:
        representing the first bit value by a plurality of absolute first amplitude values, wherein consecutive first amplitude values are not identical;
        representing the second bit value by a second amplitude value that is different from any of the first amplitude values for the second bit value, wherein a polarity of the first and second amplitude values is reversed for each cycle;
    transmitting the encoded input signal through a predetermined transmission line;
    determining whether the amplitude value of the encoded signal transmitted through the predetermined transmission line is the first amplitude value or the second amplitude value;
    identifying the first bit value or the second bit value based on a determination result at the determination step;
    detecting the reversal cycle of polarity held by the amplitude value of the encoded signal; and
    detecting a clock of the encoded signal based on the reversal cycle detected at the polarity detection step.

* * * * *